(12) United States Patent
Nguyen et al.

(10) Patent No.: US 9,572,121 B2
(45) Date of Patent: Feb. 14, 2017

(54) METHODS AND APPARATUS FOR TIMING SYNCHRONIZATION DURING A WIRELESS UPLINK RANDOM ACCESS PROCEDURE

(71) Applicant: QUALCOMM Incorporated, San Diego, CA (US)

(72) Inventors: Bao Vinh Nguyen, Corona, CA (US); Dominique Francois Bressanelli, Hessen (DE); Shailesh Maheshwari, San Diego, CA (US); Deepak Krishnamoorthi, San Diego, CA (US); Prasanna Venkata Santosh Kumar Tallapragada, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 233 days.

(21) Appl. No.: 13/966,851

(22) Filed: Aug. 14, 2013

(65) Prior Publication Data

US 2014/0050213 A1 Feb. 20, 2014

Related U.S. Application Data

(60) Provisional application No. 61/684,605, filed on Aug. 17, 2012.

(51) Int. Cl.
*H04W 74/00* (2009.01)
*H04W 56/00* (2009.01)

(52) U.S. Cl.
CPC ..... *H04W 56/0015* (2013.01); *H04W 56/0045* (2013.01); *H04W 74/008* (2013.01)

(58) Field of Classification Search
None
See application file for complete search history.

(56) References Cited

U.S. PATENT DOCUMENTS

2009/0232107 A1 9/2009 Park et al.
2010/0020786 A1 1/2010 Futaki et al.
(Continued)

FOREIGN PATENT DOCUMENTS

| EP | 2101538 A2 | 9/2009 | |
| EP | 2288223 A1 | 2/2011 | |
| JP | EP 2288223 A1 * | 2/2011 | ........ H04W 56/0045 |

OTHER PUBLICATIONS

Ericsson: "Handling of Timing Advance during RA", 3GPP Draft; R2-082736—(Updated R2-082403), 3rd Generation Partnership Project (3GPP), Mobile Competence Centre; 650, Route Des Lucioles; F-06921 Sophia-Antipolis Cedex; France, vol. RAN WG2, No. Kansas City, USA; May 9, 2008, May 9, 2008 (May 9, 2008), XP050140329, [retrieved on May 9, 2008] the whole document.

(Continued)

*Primary Examiner* — Hassan Phillips
*Assistant Examiner* — Ayanah George
(74) *Attorney, Agent, or Firm* — Patterson & Sheridan, L.L.P.

(57) ABSTRACT

Aspects generally relate to wireless communications and, more particularly, to methods, systems and apparatus for timing synchronization during a wireless uplink random access procedure. For example, certain aspects relate to a technique for receiving first timing advance information associated with uplink wireless communications with a base station (BS), transmitting a random access connection request message to the BS, receiving a random access response from the BS while the first timing advance information is within a valid time period, the random access response comprising second timing advance information associated with uplink wireless communications with the base station, determining, after receiving the random access response, that the valid time period for the first timing (Continued)

advance information has expired, and utilizing the second timing advance information for uplink communications with the BS after determining that the valid time period for the first timing advance information has expired. Numerous other aspects are provided.

29 Claims, 9 Drawing Sheets

(56) References Cited

U.S. PATENT DOCUMENTS

| | | |
|---|---|---|
| 2010/0061361 A1 | 3/2010 | Wu |
| 2010/0254356 A1* | 10/2010 | Tynderfeldt ...... H04W 56/0005 370/336 |
| 2011/0069800 A1 | 3/2011 | Ohta et al. |
| 2012/0257570 A1 | 10/2012 | Jang et al. |

OTHER PUBLICATIONS

International Search Report and Written Opinion—PCT/US2013/055061—ISA/EPO—Dec. 13, 2013.

* cited by examiner

METHODS AND APPARATUS FOR TIMING SYNCHRONIZATION DURING A WIRELESS UPLINK RANDOM ACCESS PROCEDURE

CROSS-REFERENCE TO RELATED APPLICATION(S)

This application claims the benefit of U.S. Provisional Application Ser. No. 61/684,605, entitled "METHODS AND APPARATUS FOR TIMING SYNCHRONIZATION DURING A WIRELESS UPLINK RANDOM ACCESS PROCEDURE," filed on Aug. 17, 2012, which is assigned to the assignee of the present application and hereby expressly incorporated by reference herein in its entirety.

BACKGROUND

I. Field

Certain aspects of the present disclosure generally relate to wireless communications and, more particularly, to methods and apparatus for timing synchronization during random access procedures.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, 3rd Generation Partnership Project (3GPP) Long Term Evolution (LTE) systems, Long Term Evolution Advanced (LTE-A) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

In an aspect of the disclosure, a method for wireless communications performed by a user equipment (UE) is provided. The method generally includes receiving first timing advance information associated with uplink wireless communications with a base station (BS), transmitting a random access connection request message to the BS, receiving a random access response from the BS while the first timing advance information is within a valid time period, the random access response comprising second timing advance information associated with uplink wireless communications with the BS, determining, after receiving the random access response, that the valid time period for the first timing advance information has expired, and utilizing the second timing advance information for uplink communications with the BS after determining that the valid time period for the first timing advance information has expired. The method also generally includes initiating a timer associated with the second timing advance information for a valid time period for the second timing advance information after determining that the valid time period for the first timing advance information has expired, and adjusting an expiration of the timer based on an elapsed time between the receipt of the random access response and the expiration of the valid time period for the first timing advance information.

In an aspect of the disclosure, an apparatus for wireless communications is provided. The apparatus generally includes at least one processor configured to receive a first timing advance information associated with uplink wireless communications with a base station (BS), transmit a random access connection request message to the BS, receive a random access response from the BS while the first timing advance information is within a valid time period, the random access response comprising second timing advance information associated with uplink wireless communications with the BS, determine, after receiving the random access response, that the valid time period for the first timing advance information has expired, and utilize the second timing advance information for uplink communications with the BS after determining that the valid time period for the first timing advance information has expired. In general, the at least one processor may also be configured to initiate a timer associated with the second timing advance information for a valid time period for the second timing advance information after determining that the valid time period for the first timing advance information has expired, and adjust an expiration of the timer based on an elapsed time between the receipt of the random access response and the expiration of the valid time period for the first timing advance information. The apparatus generally also includes a memory coupled with the at least one processor.

In an aspect of the disclosure, an apparatus for wireless communications is provided. The apparatus generally includes means for receiving first timing advance information associated with uplink wireless communications with a base station (BS), means for transmitting a random access connection request message to the BS, means for receiving a random access response from the BS while the first timing advance information is within a valid time period, the random access response comprising second timing advance information associated with uplink wireless communications with the BS, means for determining, after receiving the random access response, that the valid time period for the first timing advance information has expired, and means for utilizing a second timing advance information for uplink communications with the base station after determining that the valid time period for the first timing advance information has expired. The apparatus also generally includes means for initiating a timer associated with the second timing advance information for a valid time period for the second timing advance information after determining that the valid time period for the first timing advance information has expired, and means for adjusting an expiration of the timer based on an elapsed time between the receipt of the random access response and the expiration of the valid time period for the first timing advance information.

In an aspect of the disclosure, a computer program product for wireless communications by a user equipment (UE) is provided. The computer program product generally includes a computer-readable medium having code for receiving first timing advance information associated with uplink wireless communications with a base station (BS), transmitting a random access connection request message to the BS, receiving a random access response from the BS while the first timing advance information is within a valid time period, the random access response comprising second timing advance information associated with uplink wireless communications with the BS, determining, after receiving the random access response, that the valid time period for the first timing advance information has expired and utilizing the second timing advance information for uplink communications with the BS after determining that the valid time period for the first timing advance information has expired. The computer-readable medium, in general, may also have code for initiating a timer associated with the second timing advance information for a valid time period for the second timing advance information after determining that the valid time period for the first timing advance information has expired, and adjusting an expiration of the timer based on an elapsed time between the receipt of the random access response and the expiration of the valid time period for the first timing advance information.

In an aspect of the disclosure, a user equipment (UE) for wireless communications is provided. The UE generally includes a transmitter module configured to transmit a random access connection request message to a base station (BS) and a receiver module configured to receive a random access response from the BS while the first timing advance information associated with uplink wireless communications with the BS is within a valid time period, the random access response comprising second timing advance information associated with uplink wireless communications with the BS. The UE also generally includes a timing adjustment module configured to utilize the second timing advance information for uplink communications with the BS after determining that the valid time period for the first timing advance information has expired, initiate a timer associated with the second timing advance information for a valid time period for the second timing advance information after determining that the valid time period for the first timing advance information has expired, and adjust an expiration of the timer based on an elapsed time between the receipt of the random access response and the expiration of the valid time period for the first timing advance information.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
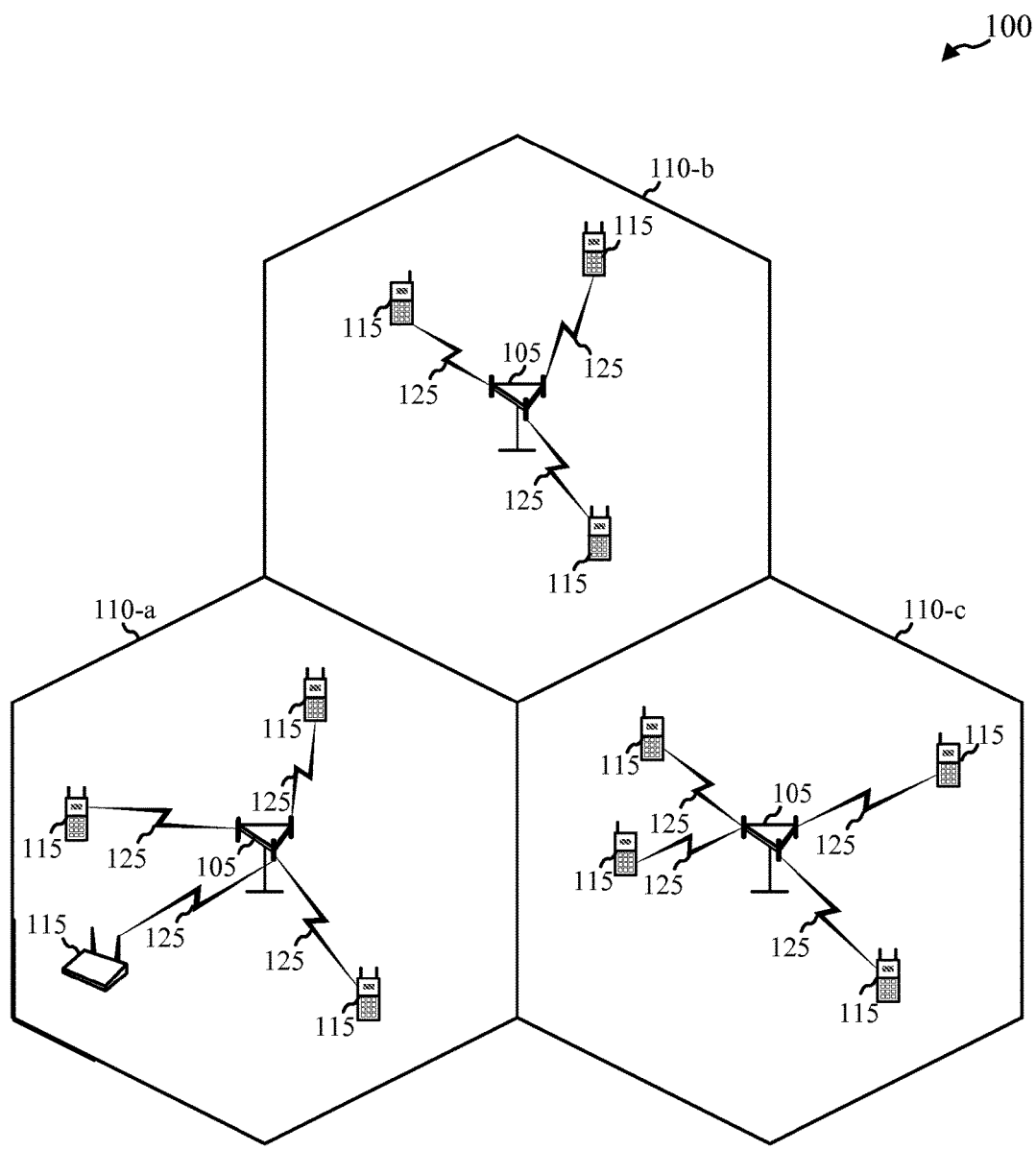
FIG. 1 illustrates an example wireless communication system, in accordance with certain aspects of the present disclosure.
Figure 1:
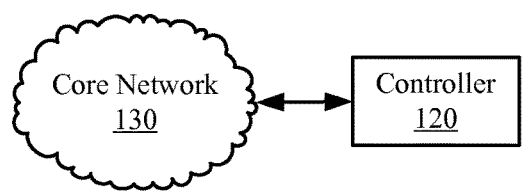

Aspects of the present disclosure provide methods, systems and devices for timing synchronization during a wireless uplink random access procedure. A user equipment (UE) may request a connection with a wireless communication network using a random access channel (RACH) request. The UE may have existing timing information for uplink communications with a base station (BS). A response which includes second uplink timing information may be received while the existing timing information is valid. The second uplink timing information may be used for subsequent uplink communications after it is determined that the existing timing information is no longer valid.

For example, in some aspects a UE may establish communications with a BS, and may receive first timing information related to such communications with the BS. The first timing information may be valid for synchronizing uplink communications with the BS for a preset period of time. The UE may monitor the validity of the first timing information through the use of a timer, and upon expiration of the timer, the first timing information is no longer valid. While the first timing information is still valid, the UE may request a connection with the BS using a random access channel (RACH) that is utilized for transmitting such connection requests. In response to the RACH connection request, the BS may transmit a response that includes second uplink timing information. The UE may, according to various aspects, use the second uplink timing information for subsequent uplink communications after it is determined that the first timing information is no longer valid. According to some aspects, the UE may initiate another timer associated with the second uplink timing information after determining that the valid time period for the first timing advance information has expired. In an aspect, an expiration of the timer associated with the second uplink timing information may be adjusted based on the elapsed time between the receipt of the response that includes second uplink timing information and expiration of the valid time period for the first timing information.

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS, and LTE are described in documents from an organization named "3rd Generation Partnership Project" (3GPP). CDMA2000 is described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

An access point (AP) may comprise, be implemented as, or known as NodeB, Radio Network Controller (RNC), enhanced NodeB (eNodeB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

A user equipment (UE) may comprise, be implemented as, or known as an access terminal (AT), a subscriber station, a subscriber unit, a mobile station (MS), a remote station, a remote terminal, a user terminal (UT), a user agent, a user device, a user station, or some other terminology. In some implementations, a UE may comprise a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates an example of a wireless communication system 100 in which aspects of the present disclosure may be employed. The wireless communication system 100 may be a broadband wireless communication system. The wireless communication system 100 may provide communication for a number of cells 110, each of which is serviced by a base station (BS) 105. The wireless communication system 100 may include a base station controller (BSC) 120 and a core network 130. In an aspect, although not shown, the controller 120 may be integrated into the core network 130. The system 100 may support operation on multiple carriers (e.g., waveform signals of different frequencies). Multi-carrier transmitters may transmit modulated signals simultaneously on the multiple carriers. For example, each modulated signal may be a multi-carrier channel modulated according to the various radio technologies described above. Each modulated signal may be sent on a different carrier and may carry control information (e.g., pilot signals, control channels, etc.), overhead information, data, etc. The system 100 may be a multi-carrier LTE network capable of efficiently allocating network resources.

The BSs 105 may wirelessly communicate with wireless communications devices, referred to as user equipments (UEs) 115 via a base station antenna (not shown). The BSs 105 may communicate with the UEs 115 under the control of the BSC 120 via multiple carriers. Each of the BSs 105 sites may provide communication coverage for a respective geographic area. In some embodiments, BS 105 may be referred to as a base transceiver station, a radio base station, a radio transceiver, a basic service set (BSS), an extended service set (ESS), a NodeB, eNodeB (eNB), Home NodeB, a Home eNodeB, or some other suitable terminology. The coverage area for each BS 105 (e.g., as illustrated in FIG. 1) is identified as 110-a, 110-b, or 110-c. The coverage area for a BS may be divided into sectors (not shown, but making up only a portion of the coverage area). The system 100 may include BSs 105 of different types (e.g., macro, pico, and/or femto base stations). A macro BS may provide communication coverage for a relatively large geographic area (e.g., 35 km in radius). A pico BS may provide coverage for a relatively small geographic area (e.g., 12 km in radius), and a femto BS may provide communication coverage for a relatively smaller geographic area (e.g., 5 km in radius). There may be overlapping coverage areas for different technologies. The UEs 115 may be dispersed throughout the coverage areas 110. Each UE 115 may be stationary or mobile. In one configuration, the UEs 115 may be able to communicate with different types of BSs such as, but not limited to, macro BSs, pico BSs, and femto BSs. A communication link 125 that facilitates transmission from a BS 105 to a UE 115 may include downlink communications from BSs 105 to UEs 115 and uplink communications from UEs 115 to BSs 105. Alternatively, a downlink may be referred to as a forward link or a forward channel, and an uplink may be referred to as a reverse link or a reverse channel.

According to certain aspects, various of the UEs 115 may transmit and/or receive communications to/from BSs 105 intermittently. For example, a UE 115 may be used for a voice call during a period, may be idle for a period, and then may be used to transmit and/or receive data such as an SMS text message. When initiating communications with a BS 105 following an idle period, or upon an initial connection with a BS 105, the UEs 115 may acquire timing information to provide communications that are properly synchronized according to the particular wireless communications protocol. Timing information may allow UEs 115 and BSs 105 to compensate for transmission delays based on, for example, a distance between the BS 105 and particular UE 115.

According to certain aspects, a random access procedure may be used by a UE 115 to initiate communications with a BS 105. In general, such a procedure may be used in various situations, such as initial access from a disconnected state or radio failure, handover requiring a random access procedure, downlink or uplink data arrival during a connected state after which the UE 115 has lost synchronization, uplink data arrival where there are no dedicated scheduling request channels available and/or other various situations. Examples of the random access procedure may include contention based random access procedures, which may be initiated on a random access channel (RACH), and contention-free (e.g., non-contention based) random access procedures. The difference between the two procedures is whether or not there is a possibility for failure using an overlapping random access preamble. The random access procedure may be used to provide timing information that a UE 115 may use to synchronize communications with the BS 105. In certain aspects, a UE 115 may use timing information obtained from previous communications with a BS during the random access procedure. As mentioned above, such timing information may be valid for a limited time, and may not be used following the expiration of the time period. In some cases, timing information from a prior connection with a BS 105 may still be valid when a UE 115 initiates a random access procedure. In such cases, the UE 115 may use the existing timing information rather than timing information provided as part of the random access procedure. However, in some cases, the timing information may expire after the random access procedure initiated. Accordingly, rather than requiring the re-initiation of a new random access procedure, certain aspects of the present disclosure provide for utilizing timing information provided as part of the random access procedure after timing information from a previous connection with the BS 105 has expired.

Figure 2:
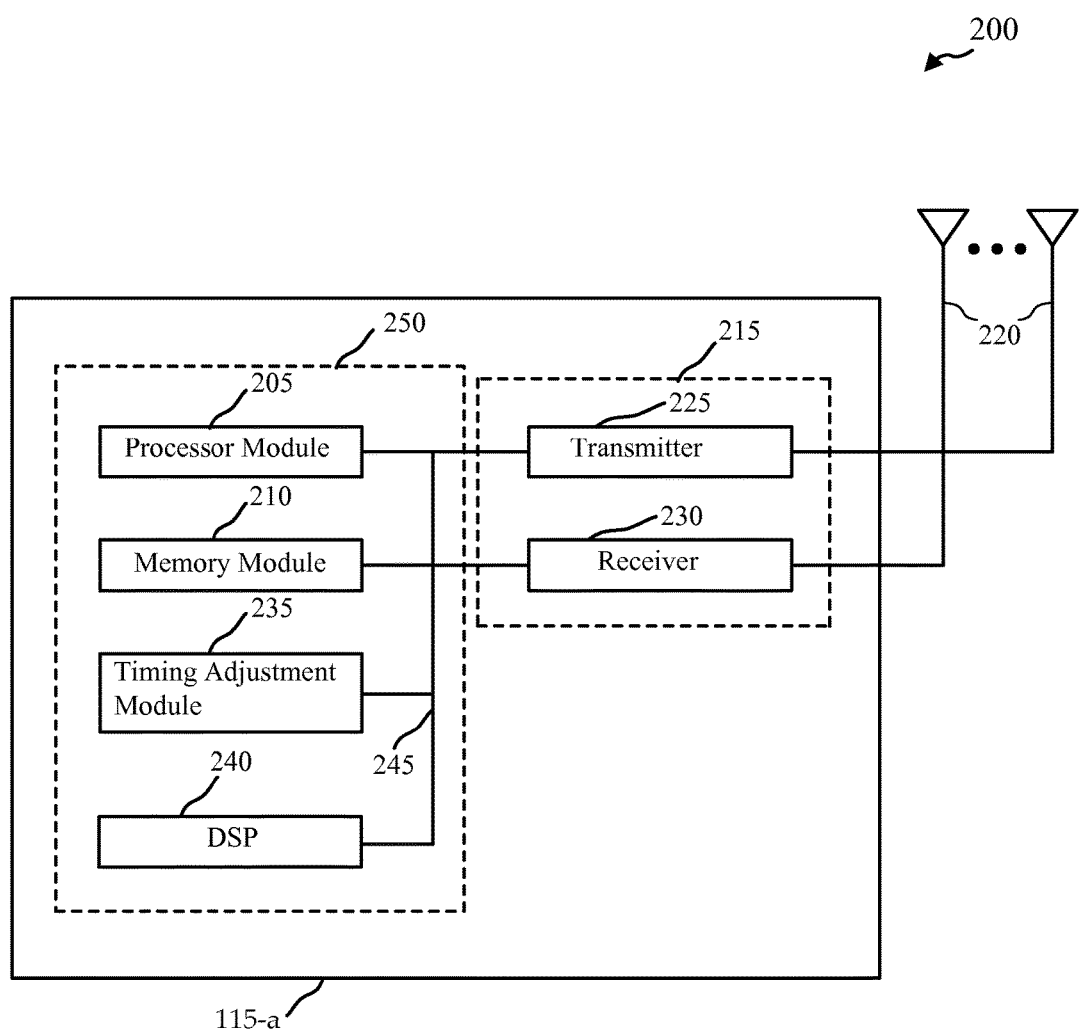
FIG. 2 illustrates a block diagram of a user equipment (UE), in accordance with certain aspects of the present disclosure.

FIG. 2 illustrates various components that may be utilized in a UE 115-a that may be employed within the wireless communication system such as illustrated in FIG. 1. The UE 115-a may be an example of a device that may be configured to implement the various methods described herein. The UE 115-a may include a processor module 205 that controls operation of the UE 115-a. The processor module 205 may also be referred to as a central processing unit (CPU). Memory module 210, which may include, for example, read-only memory (ROM) and/or random access memory (RAM), may provide instructions and data to the processor module 205. A portion of the memory module 210 may also include non-volatile random access memory (NVRAM). The processor module 205 may perform logical and arithmetic operations based on program instructions stored within the memory module 210. The instructions in the memory module 210 may be executable to implement methods such as those described herein.

The UE 115-a may also include a wireless communications module 215 connected to one or more antenna(s) 220. The wireless communications module 215 may include a transmitter 225 and a receiver 230 to allow transmission and reception of data between the UE 115-a and a remote location. According to certain aspects, the transmitter 225 and receiver 230 may be combined into a transceiver (not shown). In an aspect, the UE 115-a may also include (not shown) multiple transmitters, multiple receivers, and/or multiple transceivers.

According to certain aspects, the UE 115-a illustrated in FIG. 2 may also include a timing adjustment module 235. The timing adjustment module 235 may perform timing adjustments to provide communications between the UE 115-a and a BS that are properly synchronized according to the particular wireless communications protocol. The timing adjustment module 235 may, as will be described in more detail below, adjust timing of communications according to timing information from a prior connection with a BS and/or according to timing information received during a random access procedure. The UE 115-a may also include a digital signal processor (DSP) 240 for use in processing signals. The various components of the UE 115-a may be coupled together by a bus system 245, which may include a power bus, a control signal bus, and a status signal bus in addition to a data bus. In some examples, processor module 205, memory module 210, timing adjustment module 235, and DSP 240 may be included as components of a controller module 250.

Figure 3:
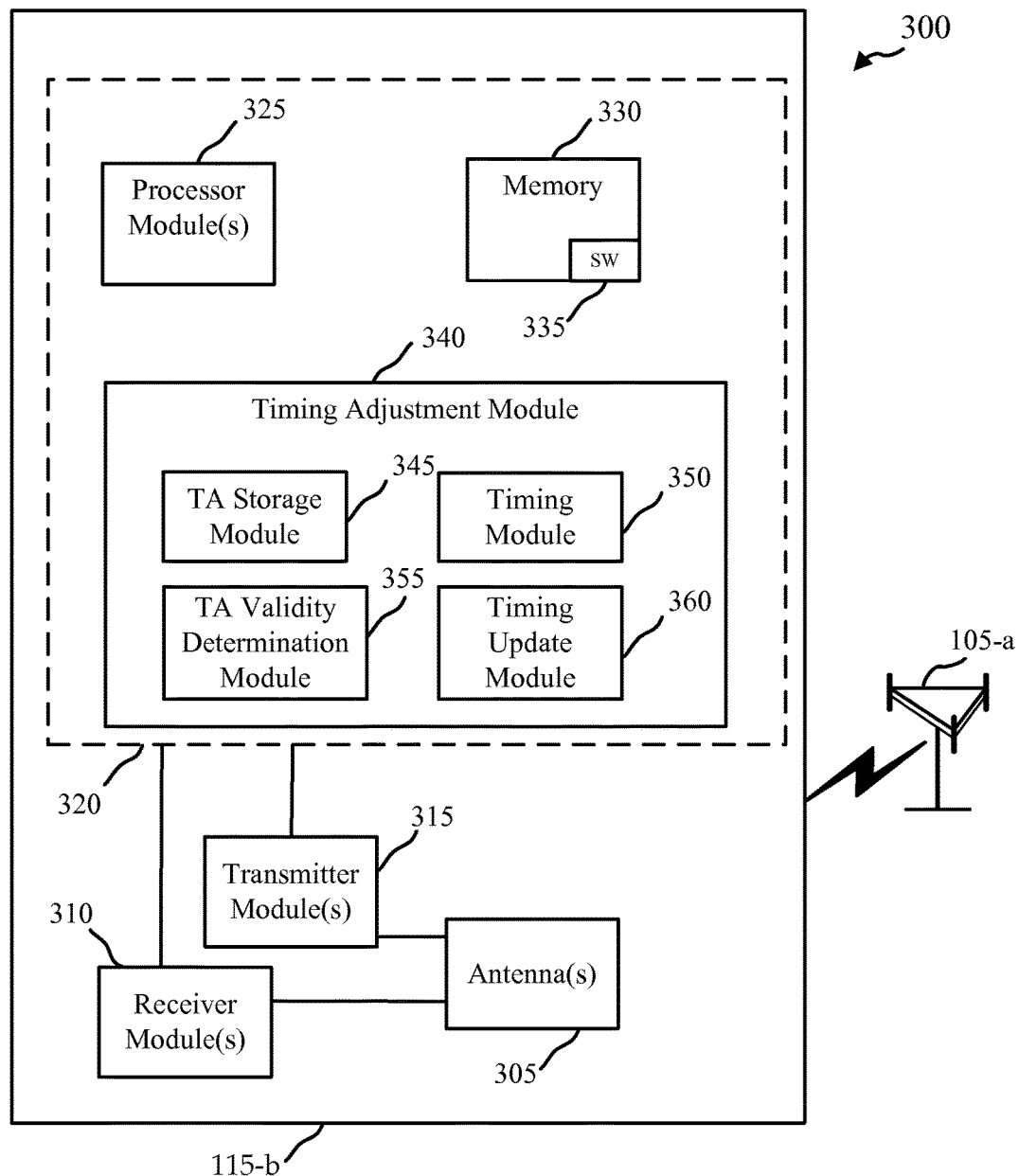
FIG. 3 illustrates a block diagram of a UE in a wireless communications system, in accordance with certain aspects of the present disclosure.

FIG. 3 illustrates an example of a UE in a wireless communications system 300 that performs timing adjustment for uplink communications, according to certain aspects of the present disclosure. System 300 includes a UE 115-b that may communicate with BS 105-a to receive access to one or more wireless networks, similarly as described above. In certain aspects, the UE 115-b may be an example of one of UEs 115 illustrated in FIGS. 1-2. As similarly described above, UE 115-b may include one or more antenna(s) 305 communicatively coupled to receiver module(s) 310 and transmitter module(s) 315, both of which, in turn, may be communicatively coupled to a control module 320. Control module 320 may include one or more processor module(s) 325, a memory 330 that may include software 335, and a timing adjustment module 340. The software 335 may be for execution by processor module 325 and/or a timing adjustment module 340.

The processor module(s) 325 may include an intelligent hardware device, e.g., a central processing unit (CPU), a microcontroller, an application specific integrated circuit (ASIC), etc. The memory 330 may include random access memory (RAM) and/or read-only memory (ROM). The memory 330 may store computer-readable, computer-executable software code 335 containing instructions that are configured to, when executed (or when compiled and executed), cause the processor module 325 and/or timing adjustment module 340 to perform various functions described herein (e.g., timing adjustment storage, maintaining timers associated with timing adjustment information, validity determination for timing information, timing information updates, etc.). The timing adjustment module 340 may be implemented as a part of the processor module(s) 325, or may be implemented using one or more separate CPUs or ASICs, for example. The transmitter module(s) 315 may transmit to BS 105-a (and/or other BSs 105) to establish communications with one or more wireless communications networks (e.g., E-UTRAN, UTRAN, etc.), as described above. The receiver module(s) 310 may receive downlink transmissions from BS 105-a (and/or other BSs 105), as described above. Downlink transmissions may be received and processed at the UE 115-b.

The timing adjustment module 340 may include a timing adjustment (TA) storage module 345, a timing module 350, a TA validity determination module 355 and a timing update module 360. According to an aspect, as described above, UE 115-b may request a connection with BS 105-a through the use of a random access connection request. The random access connection procedure may be initiated, in some examples, through the transmission of a random access connection request message to BS 105-a. In response to the random access request, the BS 105-a may transmit a random access response, which may be received by receiver module(s) 310 and provided to control module 320. As mentioned above, in some cases the UE 115-b may have previously communicated with BS 105-a, and may have timing adjustment information associated with the previous communications. TA validity determination module 355 may be used to determine whether the timing adjustment is still valid. In some examples, TA validity determination module 355 may make this determination based on the status of one or more timers that may be activated in the timing module 350. The random access response from the BS 105-a may include timing information that may be used for timing adjustment at the UE 115-b. In some examples, the TA validity determination module 355 may determine that the previous timing adjustment information is within a valid time period. In such cases, the previous timing adjustment information may be used for subsequent uplink communications with the BS 105-a with the new timing adjustment information received from BS 105-a stored by timing adjustment storage module 345 (e.g., stored in a location in memory 330). In some examples, the TA validity determination module 355 may determine that the previous timing adjustment information is no longer valid (e.g., through the expiration of a timing advance timer at timing module 350), in which case the timing adjustment information received in the random access response from the BS 105-a may be used for uplink communications with the BS 105-a.

According to certain aspects, the timing update module 360 may, in some examples, start a timer in the timing module 350 associated with the new timing adjustment information that is received in the random access response from BS 105-a. In an aspect, this timer may be initiated to measure the valid time period based on the elapsed time between receiving the random access response and expiration of the timer associated with the previous timing adjustment information. Additionally or alternatively, in an aspect, the timing update module 360 may initiate a timer associated with the new timing adjustment information after it is determined that the valid time period for the previous timing adjustment information has expired, and adjust an expiration of the timer based on the elapsed time between the receipt of the random access response and the expiration of the previous timing adjustment information. In an aspect, following the receipt of the random access response from BS 105-a, the control module 320 may transmit, through transmitter module(s) 315, a radio resource control (RRC) connection request to the BS 105-a after receiving the random access response. In an aspect, the BS 105-a, in response to the RRC connection request, may transmit a contention resolution response in examples using contention-based random access procedures. In an aspect, the timing adjustment module 340, may determine that the valid time period for the previous timing adjustment information has expired after transmitting the RRC connection request, and utilize the new timing adjustment information for uplink communications with the BS after receiving the contention resolution response. According to certain aspects, in some cases, the valid time period for the previous timing adjustment information may expire after receiving the contention resolution response, and an uplink communication, such as a scheduling request, may be transmitted to the BS 105-a utilizing the new timing advance information. The components of UE 115-b may, individually or collectively, be implemented with one or more Application Specific Integrated Circuits (ASICs) adapted to perform some or all of the applicable functions in hardware. Each of the noted modules may be a means for performing one or more functions related to operation of the UE 115-b.

Figure 4:
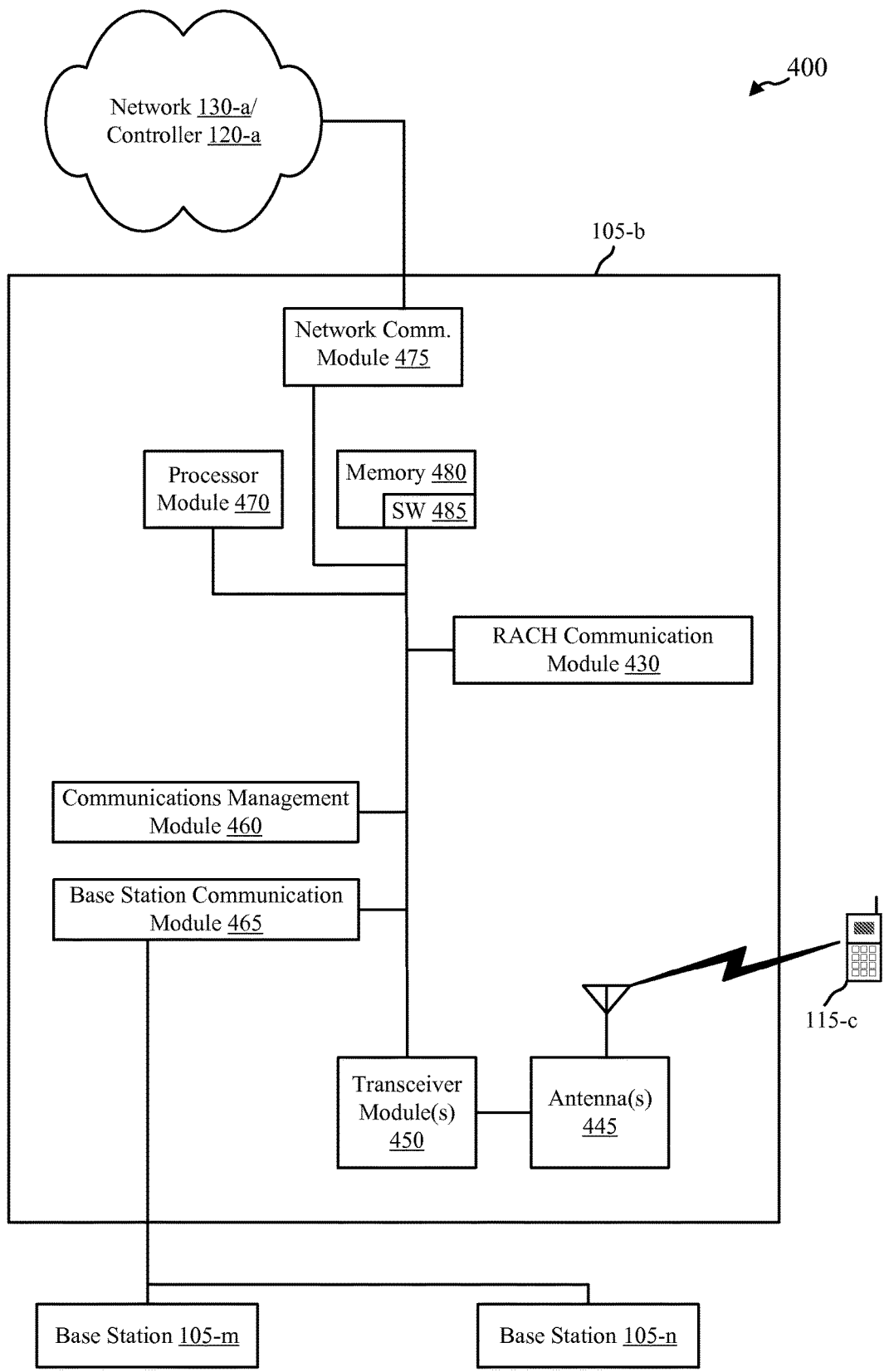
FIG. 4 illustrates a block diagram of a base station (BS) in a wireless communication system, in accordance with certain aspects of the present disclosure.

FIG. 4 illustrates a block diagram of a system 400 including a BS 105-b and a UE 115-c, according to certain aspects of the present disclosure. System 400 may be a portion of the systems 100, and/or 300 of FIGS. 1 and 3, respectively. System 400 may include a BS 105-b. The BS 105-b may include antenna(s) 445, a transceiver module 450, memory 480, and a processor module 470, which each may be in communication, directly or indirectly, with each other (e.g., over one or more buses). An RACH communication module 430 may be implemented as part of processor module 470, and/or one or more separate components, and may perform random access connection request management with one or more UEs 115-c, such as described above. The transceiver module 450 may be configured to communicate bi-directionally, via the antenna(s) 445, with UE 115-c. The transceiver module 450 (and/or other components of the BS 105-b) may also be configured to communicate bi-directionally with one or more networks. In some cases, the BS 105-b may communicate with the core network 130-a and/or controller 120-a through network communications module 475. BS 105-b may be an example of an eNodeB, a Home eNodeB, a NodeB, and/or a Home NodeB. Controller 120-a may be integrated into BS 105-b in some cases, such as with an eNodeB.

According to an aspect, BS 105-b may also communicate with other BSs 105, such as BS 105-m and BS 105-n. Each of the BSs 105 may communicate with UE 115-c using different wireless communications technologies, such as different Radio Access Technologies (RATs). In some cases, BS 105-b may communicate with other BSs such as BS 105-m and/or BS 105-n utilizing BS communication module 465. In some embodiments, BS communication module 465 may provide an X2 interface within an LTE wireless communication technology to provide communication between some of the BSs 105. In some embodiments, BS 105-c may communicate with other BSs through controller 120-a and/or core network 130-a.

According to certain aspects, the memory 480 may include random access memory (RAM) and read-only memory (ROM). The memory 480 may also store computer-readable, computer-executable software code 485 containing instructions that are configured to, when executed, cause the processor module 470 and/or RACH communication module 430 to perform various functions described herein (e.g., receipt of random access connection requests, timing advance calculations for including in a random access response, contention resolution, etc.). Alternatively, the software code 485 may not be directly executable by the processor module 470 but may be configured to cause the computer, e.g., when compiled and executed, to perform functions described herein.

According to certain aspects, the processor module 470 may include an intelligent hardware device, e.g., a central processing unit (CPU), a microcontroller, an application-specific integrated circuit (ASIC), etc. The transceiver module 450 may include a modem configured to modulate the packets and provide the modulated packets to the antenna(s) 445 for transmission, and to demodulate packets received from the antenna(s) 445. While some examples of the BS 105-*b* may include a single antenna 445, the BS 105-*b* may include multiple antennas 445 for multiple links which may support carrier aggregation. For example, one or more links may be used to support communications with UE 115-*c*. In an aspect, according to the architecture of FIG. 4, the BS 105-*b* may further include a communications management module 460, which may manage communications with other BSs 105. Components of BS 105-*b* may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the BS 105-*b*.

Figure 5:
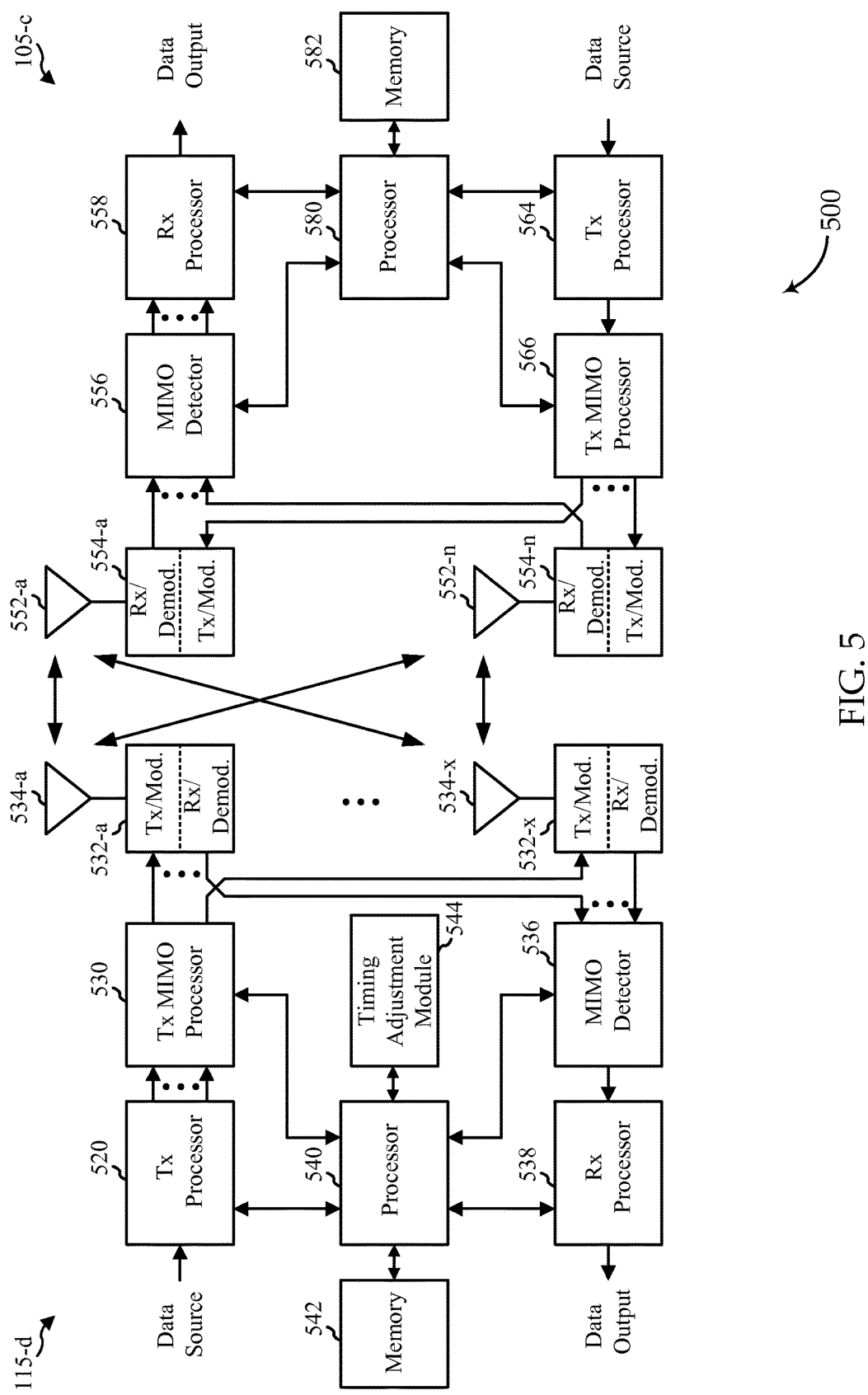
FIG. 5 illustrates a block diagram of a UE and a BS in a wireless communications system, in accordance with certain aspects of the present disclosure.

FIG. 5 illustrates a block diagram of a system 500 including a BS 105-*c* and a UE 115-*d*, according to certain aspects of the present disclosure. System 500 may be an example of the system 100 of FIG. 1, system 300 of FIG. 3, and/or system 400 of FIG. 4. The BS 105-*c* may be equipped with antennas 552-*a* through 552-*n*, and the UE 115-*d* may be equipped with antennas 534-*a* through 534-*x*. UE 115-*d* and BS 105-*c* may communicate according to network protocols of one or more wireless communications networks, such as, for example, E-UTRAN, UTRAN, and GERAN, similarly as discussed above. At the UE 115-*d*, a transmit (TX) processor 520 may receive data from a data source and from a processor 540, and/or timing adjustment module 544. Timing adjustment module 544 may perform, or assist in the performance, of uplink timing adjustment such as associated with random access connection requests as described above. As described above, in an aspect, UE 115-*d* may attempt to connect to BS 105-*c* through a random access request. In response thereto, the UE 115-*d* may receive a random access response that includes timing adjustment information. In cases where the UE 115-*d* has existing valid timing adjustment information for uplink transmissions, the timing adjustment information received with the random access response may be stored and used for subsequent uplink transmission in the event, for example, that the previous timing adjustment information expires during the random access connection process.

The TX processor 520 may process (e.g., encode and symbol map) the data, and control information to obtain data symbols and control symbols, respectively, with timing adjustments for uplink transmissions. The transmit processor 520 may also generate reference symbols, and cell-specific reference signals. A TX multiple-input multiple-output (MIMO) processor 530 may perform spatial processing (e.g., precoding) on the data symbols, the control symbols, and/or the reference symbols, if applicable, and may provide output symbol streams to the TX modulators 532-*a* through 532-*x*. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a uplink signal. Uplink signals from modulators 532-*a* through 532-*x* may be transmitted via the antennas 532-*a* through 532-*x*, respectively.

At the BS 105-*c*, the antennas 552-*a* through 552-*n* may receive the uplink signals from the UE 115-*d* and may provide the received signals to the demodulators 554-*a* through 554-*n*, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554-*a* through 554-*n*, perform MIMO detection on the received symbols, if applicable, and provide detected symbols. A receive (RX) processor 558 may process (e.g., demodulate, deinterleave, and decode) the detected symbols, providing decoded data to a data output, and provide decoded control information to a processor 580, and/or memory 582. RX processor 558 also may perform error correction on the decoded data to correct bit errors that may be present in the decoded data.

On the uplink, at the BS 105-*c*, a TX processor 564 may receive and process data from a data source and from the processor 580 and/or memory 582. The TX processor 564 may also generate reference symbols for a reference signal. The symbols from the TX processor 564 may be precoded by a TX MIMO processor 566, if applicable, further processed by the demodulators 554-*a* through 554-*n* (e.g., for SC-FDMA, etc.), and be transmitted to the UE 115-*d*. At the UE 115-*d*, the downlink signals from the BS 105-*d* may be received by the antennas 534, processed by the demodulators 532, detected by a MIMO detector 536, if applicable, and further processed by a RX processor 538 to obtain decoded data and control information sent by the BS 105-*c*. The RX processor 538 may provide the decoded data to a data output and decoded control information to the processor 540. The components of the UE 115-*d* may, individually or collectively, be implemented with one or more Application Specific Integrated Circuits (ASICs) adapted to perform some or all of the applicable functions in hardware. Similarly, the components of the BS 105-*c* may, individually or collectively, be implemented with one or more Application Specific Integrated Circuits (ASICs) adapted to perform some or all of the applicable functions in hardware. Each of the noted modules of system 500 may be a means for performing one or more functions related to operation of the system 500 and/or other functions provided herein. In aspects, one or more of the modules of FIG. 3 may be included in one or more of the processors 540, 538, 520, 530 of FIG. 5.

Figure 6:
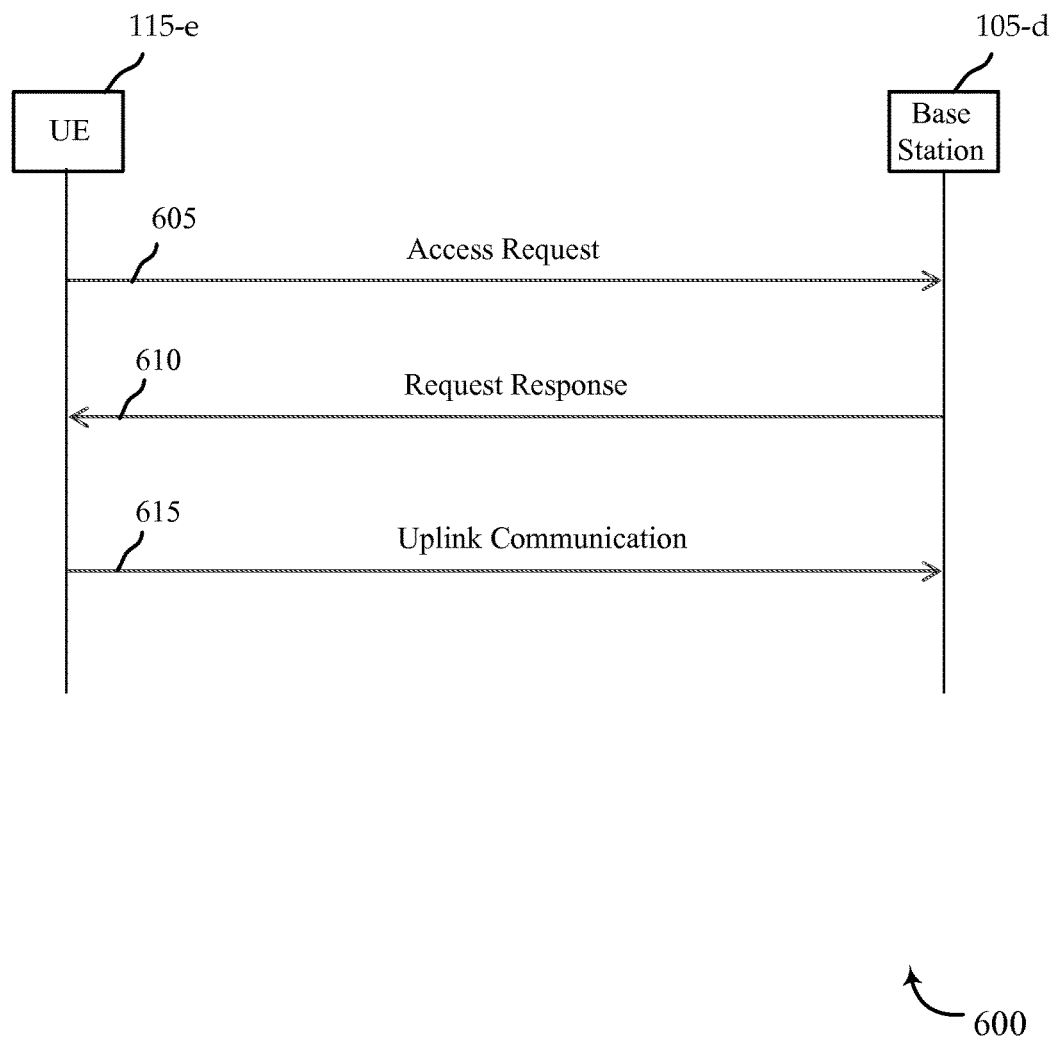
FIG. 6 illustrates a message flow for a random access procedure, in accordance with certain aspects of the present disclosure.

FIG. 6 illustrates a message flow 600 for a random access procedure between a UE 115-*e* and a BS 105-*d*, according to certain aspects of the present disclosure. At 605, UE 115-*e* may send an access request to BS 105-*d*. In certain aspects, the access request 605 may be transmitted following prior communications with BS 105-*d*, in which case, UE 115-*e* may include valid timing adjustment information for uplink data transmissions with BS 105-*d*. The BS 105-*d* transmits a request response 610 in response to the access request 605. The request response 610 may include timing information that the UE 115-*e* may use in subsequent uplink data transmissions. In some examples, when the UE 115-*e* includes valid uplink timing adjustment information from a prior connection, the newly received timing adjustment information may be stored for later use if needed. At block 615, the UE 115-*e* sends uplink communications to the BS 105-*d*. The uplink communications may be transmitted utilizing timing adjustment information from a prior connection, if still valid, or may use timing adjustment included in request response 610 if it is determined that the prior timing adjustment information has expired.

Figure 7:
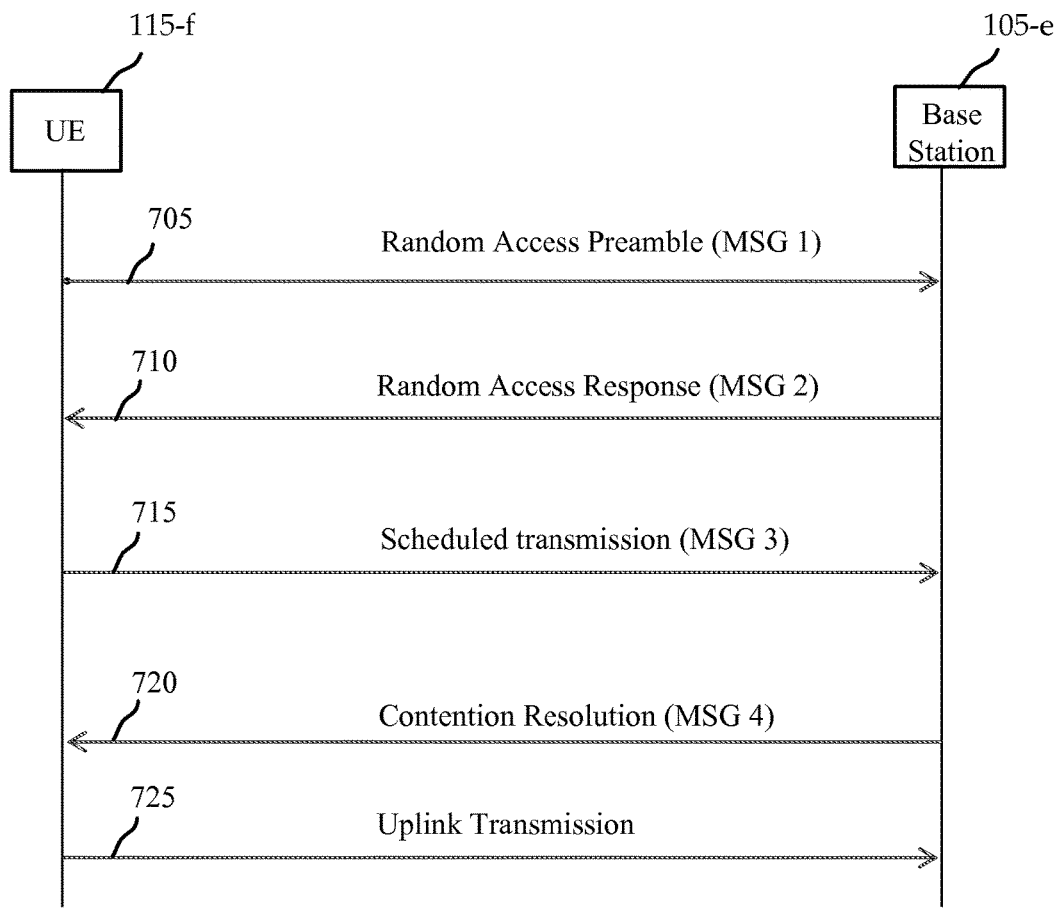
FIG. 7 illustrates a message flow for a contention based random access procedure, in accordance with certain aspects of the present disclosure.

According to certain aspects, the random access connection procedure may be a random access procedure that is defined for random access requests in an LTE system. FIG. 7 illustrates a message flow for an LTE contention based random access procedure between a UE 115-*f* and a BS 105-*e*, in accordance with certain aspects of the disclosure. At 705, the UE 115-*f* may send a random access preamble (MSG 1), assuming an initial Timing Advance of 0 for FDD. Typically, a preamble is randomly chosen by the UE 115-*f* among a set of preambles allocated on the cell and may be linked to a requested size for MSG 3, as defined in the LTE contention based random access procedure. At 710, BS 105-*e* may send a random access response (MSG 2). In an aspect, the random access response may include timing advance information to be used in subsequent uplink transmissions, a random access preamble identifier (RAPID) field, and/or a field of the medium access control (MAC) header, which may be equal to the decoded preamble ID from MSG 1 and may enable the UE 115-*f* to match the random access request with the initial request. In an aspect, MSG 2 710 may also indicate an uplink grant for upcoming MSG 3 715, and/or an assignment of a temporary cell radio network temporary identifier (C-RNTI). In an aspect, the random access response 710 may be sent, for example, on a physical downlink shared channel (PDSCH).

The UE 115-*f* may send a scheduled transmission (MSG 3) at 715, using the grant provided in MSG 2 710. MSG 3 715 may convey a UE identifier, and use uplink timing adjustments based on valid prior timing adjustments at the UE 115-*f* from a prior connection with BS 105-*e*. At 720, the BS 105-*e* may end the random access procedure by decoding MSG 3 715 and providing contention resolution (MSG 4) which may either echo back an RRC signaling message from MSG 3 715, or send an UL grant (e.g., DCI 0) scrambled with a cell radio network temporary identifier (C-RNTI). Following contention resolution 720, the UE 115-*f* may transmit an uplink transmission 725 utilizing prior timing adjustment information in the event that such information exists and is still valid, or utilizing the timing adjustment information provided in MSG 2 in the event that prior timing adjustment information either does not exist or has expired. In some examples, the UE 115-*f* may store the timing adjustment information from MSG 2 710 when (e.g., after) it is determined that prior timing adjustment information is still valid. In order to maintain an appropriate time period of validity for the new timing adjustment information from MSG 2 710, the UE 115-*f* may monitor the elapsed time (e.g., with one or more timers) between the receipt of MSG 2 710 and the expiration of the prior timing advance information. The period of validity for the new timing advance information may then be adjusted to compensate for the time between receipt of MSG 2 710 and the expiration of the prior timing adjustment information. In aspects, the timing adjustment information provided in MSG 2 may be employed by the UE 115-*f* for a UE uplink transmission (e.g., associated with the random access procedure) any time after the expiration of the prior timing adjustment information.

Figure 8:
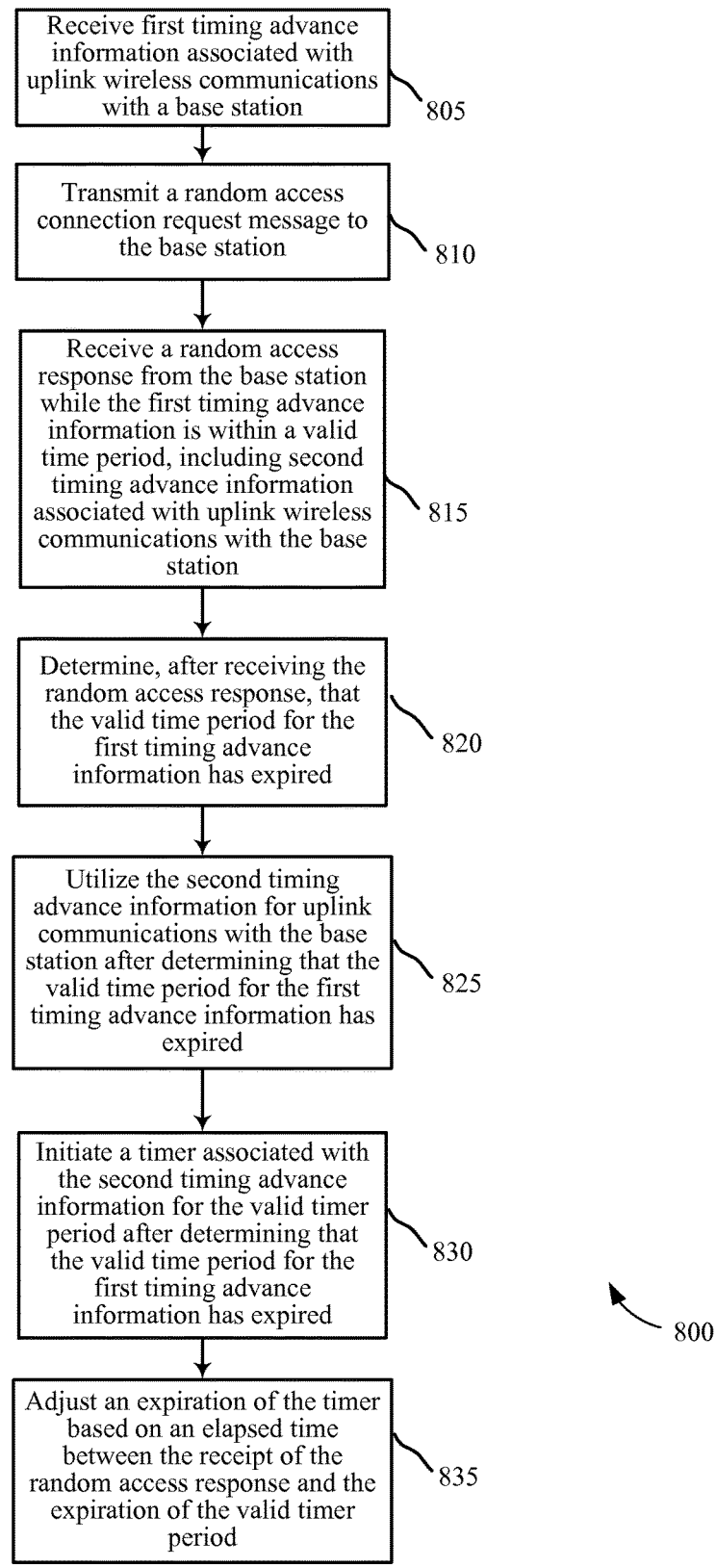
FIG. 8 illustrates example operations for timing synchronization during random access procedures, in accordance with certain aspects of the present disclosure.

FIG. 8 illustrates example operations 800 for timing synchronization during random access procedures, according to certain aspects of the present disclosure. The operations 800 may be performed by a UE, such as, for example, a UE of FIG. 1, 2, 3, 4 or 5, or using any combination of the devices described for these figures.

The operations 800 begin, at 805, by receiving first timing advance information associated with uplink wireless communications with a BS. This timing advance information may be received through a connection between the UE and BS, for example. At 810, the UE transmits a random access connection request message to the BS. For example, in certain aspects, a UE may transmit a random access request preamble to the BS to request a connection. At 815, the UE receives a random access response from the BS while the first timing advance information is within a valid time period. In an aspect, the random access response may include second timing advance information associated with uplink wireless communications with the BS.

At 820, the UE determines, after receiving the random access response, that the valid time period for the first timing advance information has expired. At 825, the UE utilizes the second timing advance information for uplink communications with the BS after determining that the valid time period for the first timing advance information has expired. At 830, the UE initiates a timer associated with the second timing advance information for a valid time period for the second timing advance information after determining that the valid time period for the first timing advance information has expired. At 835, the UE adjusts an expiration of the timer based on an elapsed time between the receipt of the random access response and the expiration of the valid time period for the first timing advance information.

In an aspect, as described above, according to 825, the UE may, for example, transmit a radio resource control (RRC) connection request to the BS after receiving the random access response, utilizing the first or second timing advance information, and receive a contention resolution response from the BS responsive to the RRC connection request. In some examples, the UE may determine that the valid time period for the first timing advance information has expired after transmitting the RRC connection request, in which case the second timing advance information for uplink communications with the BS is used after receiving the contention resolution response. Accordingly, uplink data may be transmitted to the BS following contention resolution, the uplink transmission utilizing the first timing advance information when the first timing advance information is within the valid time period for the first timing advance information, and the second timing advance information when the valid time period for the first timing advance information has expired. In an aspect, the uplink transmission may include, for example, a scheduling request to the BS utilizing the second timing advance information when it is determined that the first timing advance information expired following the receipt of the random access response. In some examples, the random access response may include a unique UE identification that the UE may use for a subsequent RRC connection request to the BS. In an aspect, in response to the RRC connection request, the BS may also use the unique UE identification in a contention resolution response to the UE.

In another aspect, according to 830, the UE may utilize the timer associated with the second timing advance information to measure the valid time period based on (e.g., less) the elapsed time between receiving the random access response and expiration of the valid time period for the first timing advance information. In such a manner, the valid time period for the second timing advance information may be maintained when the second timing advance information is used after the receipt of the random access response.

Figure 9:
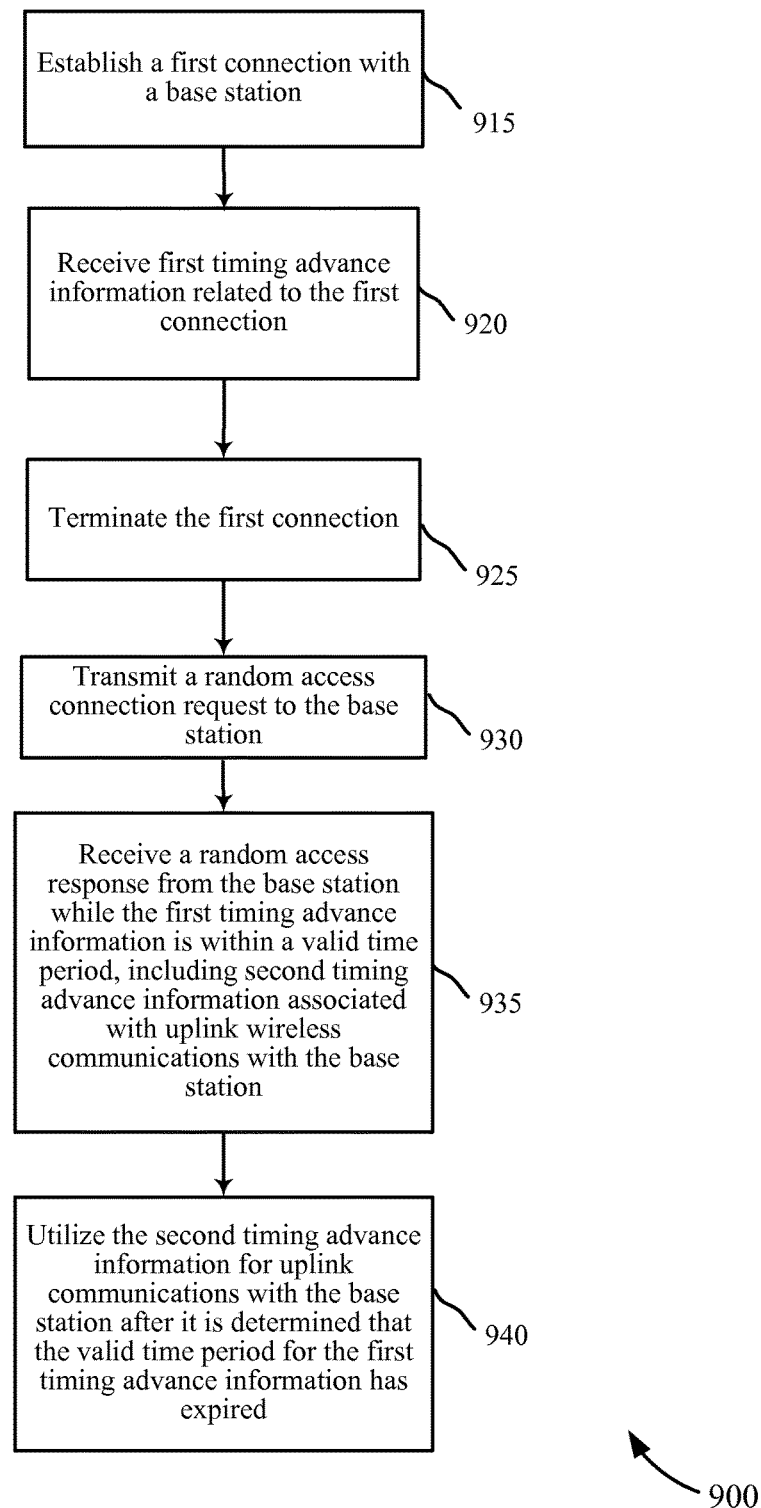
FIG. 9 illustrates example operations for timing synchronization during random access procedures, in accordance with certain aspects of the present disclosure.

As mentioned earlier, in some cases, a UE may have existing timing advance information that is still valid when a random access connection procedure is initiated. FIG. 9 illustrates example operations 900 for timing synchronization during random access procedures, in accordance with certain aspects of the present disclosure. The operations 900 may be performed by a UE, such as, for example, a UE of FIG. 1, 2, 3, 4 or 5, or using any combination of the devices described for these figures.

The operations begin, at 915, by establishing a first connection with a BS. At 920, as part of the first connection, the UE receives first timing advance information related to the first connection. At 925, at some point, the first connection is terminated. In an aspect, such a termination may result from, for example, the termination of a voice call, the termination of a data message to/from the UE, and/or a radio link failure, to name but a few examples. At 930, the UE transmits a random access connection request to the BS. At 935, the UE receives a random access response from the BS while the first timing advance information is within a valid time period, the response including second timing advance information associated with uplink wireless communications with the BS. At 940, the UE utilizes the second timing advance information for uplink communications with the BS after it is determined that the valid time period for the first timing advance information has expired.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The various operations of methods described above may be performed by any suitable means capable of performing the corresponding functions. The means may include various hardware and/or software component(s) and/or module(s), including, but not limited to a circuit, an application specific integrated circuit (ASIC), or processor. Such means may be included in and/or be one or more components illustrated in the Figures. Generally, where there are operations illustrated in Figures, those operations may have corresponding counterpart means-plus-function components.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium.

For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The steps of a method or algorithm described in connection with the present disclosure may be embodied directly in hardware, in a software module executed by a processor, or in a combination of the two. A software module may reside in any form of storage medium that is known in the art. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   receiving first timing advance information associated with uplink wireless communications with a base station (BS);
   initiating a first timer associated with the first timing advance information to measure a valid time period for the first timing advance information;
   transmitting a random access connection request message to the BS;
   receiving a random access response from the BS while the first timing advance information is within the valid time period for the first timing advance information, the random access response comprising second timing advance information associated with uplink wireless communications with the BS;
   transmitting a radio resource control (RRC) connection request to the BS after receiving the random access response;
   receiving a contention resolution response from the BS responsive to the RRC connection request;
   determining, after receiving the contention resolution response, that the valid time period for the first timing advance information has expired;
   utilizing the second timing advance information for uplink communications with the BS after determining that the valid time period for the first timing advance information has expired;
   initiating a second timer, different from the first timer, associated with the second timing advance information for a valid time period for the second timing advance information after determining that the valid time period for the first timing advance information has expired; and
   adjusting an expiration of the second timer based on an elapsed time between the receipt of the random access response and the expiration of the valid time period for the first timing advance information.

2. The method of claim 1, further comprising transmitting uplink data to the BS, wherein the transmitting uplink data utilizes:
   the first timing advance information when the first timing advance information is within the valid time period for the first timing advance information; and
   the second timing advance information when the valid time period for the first timing advance information has expired.

3. The method of claim 1, wherein utilizing the second timing advance information for uplink communications with the BS after determining that the valid time period for the first timing advance information has expired comprises transmitting a scheduling request to the BS utilizing the second timing advance information.

4. The method of claim 1, further comprising storing the second timing advance information received in the random access response.

5. The method of claim 4, wherein the storing of the second timing advance information is performed after it is determined that the first timing advance information is within the valid time period for the first timing advance information.

6. The method of claim 1, wherein the RRC connection request is transmitted to the BS using a unique UE identification; and wherein the contention resolution response received from the BS responsive to the RRC connection request comprises the unique UE identification.

7. The method of claim 1, wherein the BS is an enhanced-NodeB (eNodeB) within a Long Term Evolution (LTE) wireless communications network.

8. An apparatus for wireless communications, comprising:
   at least one processor configured to:
      receive first timing advance information associated with uplink wireless communications with a base station (BS);
      initiate a first timer associated with the first timing advance information to measure a valid time period for the first timing advance information;
      transmit a random access connection request message to the BS;

receive a random access response from the BS while the first timing advance information is within the valid time period for the first timing advance information, the random access response comprising second timing advance information associated with uplink wireless communications with the BS;

transmit a radio resource control (RRC) connection request to the BS after receiving the random access response;

receive a contention resolution response from the BS responsive to the RRC connection request;

determine, after receiving the contention resolution response, that the valid time period for the first timing advance information has expired;

utilize the second timing advance information for uplink communications with the BS after determining that the valid time period for the first timing advance information has expired;

initiate a second timer, different from the first timer, associated with the second timing advance information for a valid time period for the second timing advance information after determining that the valid time period for the first timing advance information has expired; and adjust an expiration of the second timer based on an elapsed time between the receipt of the random access response and the expiration of the valid time period for the first timing advance information; and a memory coupled to the at least one processor.

9. The apparatus of claim 8, wherein the at least one processor is further configured to:

transmit uplink data utilizing the first timing advance information when the first timing advance information is within the valid time period for the first timing advance information; and transmit uplink data utilizing the second timing advance information when the valid time period for the first timing advance information has expired.

10. The apparatus of claim 8, wherein the at least one processor is configured to utilize the second timing advance information for uplink communications with the BS after determining that the valid time period for the first timing advance information has expired by transmitting a scheduling request to the BS utilizing the second timing advance information.

11. The apparatus of claim 8, the at least one processor is further configured to store the second timing advance information received in the random access response.

12. The apparatus of claim 11, wherein the at least one processor is further configured to store the second timing advance information after it is determined that the first timing advance information is within the valid time period for the first timing advance information.

13. The apparatus of claim 8, wherein the RRC connection request is transmitted to the BS using a unique UE identification; and wherein the contention resolution response received from the BS responsive to the RRC connection request comprises the unique UE identification.

14. The apparatus of claim 8, wherein the BS is an enhanced-NodeB (eNodeB) within a Long Term Evolution (LTE) wireless communications network.

15. An apparatus for wireless communications, comprising:

means for receiving first timing advance information associated with uplink wireless communications with a base station (BS);

means for initiating a first timer associated with the first timing advance information to measure a valid time period for the first timing advance information;

means for transmitting a random access connection request message to the BS;

means for receiving a random access response from the BS while the first timing advance information is within the valid time period for the first timing advance information, the random access response comprising second timing advance information associated with uplink wireless communications with the BS;

means for transmitting a radio resource control (RRC) connection request to the BS after receiving the random access response;

means for receiving a contention resolution response from the BS responsive to the RRC connection request;

means for determining, after receiving the contention resolution response, that the valid time period for the first timing advance information has expired;

means for utilizing the second timing advance information for uplink communications with the BS after determining that the valid time period for the first timing advance information has expired;

means for initiating a second timer, different from the first timer, associated with the second timing advance information for a valid time period for the second timing advance information after determining that the valid time period for the first timing advance information has expired; and means for adjusting an expiration of the second timer based on an elapsed time between the receipt of the random access response and the expiration of the valid time period for the first timing advance information.

16. The apparatus of claim 15, further comprising:

means for transmitting uplink data to the BS, wherein the means for transmitting uplink data utilizes the first timing advance information when the first timing advance information is within the valid time period for the first timing advance information, and wherein the means for transmitting uplink data utilizes the second timing advance information when the valid time period for the first timing advance information has expired.

17. The apparatus of claim 15, wherein the means for utilizing the second timing advance information for uplink communications with the BS after determining that the valid time period for the first timing advance information has expired comprises means for transmitting a scheduling request to the BS utilizing the second timing advance information.

18. The apparatus of claim 15, further comprising means for storing the second timing advance information received in the random access response.

19. The apparatus of claim 18, wherein the storing of the second timing advance information is performed after it is determined that the first timing advance information is within the valid time period for the first timing advance information.

20. The apparatus of claim 15, wherein the RRC connection request is transmitted to the BS using a unique user equipment (UE) identification; and wherein the contention resolution response received from the BS responsive to the RRC connection request comprises the unique UE identification.

21. The apparatus of claim 15, wherein the BS is an enhanced-NodeB (eNodeB) within a Long Term Evolution (LTE) wireless communications network.

22. A non-transitory computer-readable medium encoded with one or more instructions, the one or more instructions executable by one or more processors for:
  receiving first timing advance information associated with uplink wireless communications with a base station (BS);
  initiating a first timer associated with the first timing advance information to measure a valid time period for the first timing advance information;
  transmitting a random access connection request message to the BS;
  receiving a random access response from the BS while the first timing advance information is within the valid time period for the first timing advance information, the random access response comprising second timing advance information associated with uplink wireless communications with the BS;
  transmitting a radio resource control (RRC) connection request to the BS after receiving the random access response;
  receiving a contention resolution response from the BS responsive to the RRC connection request;
  determining, after receiving the contention resolution response, that the valid time period for the first timing advance information has expired;
  utilizing the second timing advance information for uplink communications with the BS after determining that the valid time period for the first timing advance information has expired;
  initiating a second timer, different from the first timer, associated with the second timing advance information for a valid time period for the second timing advance information after determining that the valid time period for the first timing advance information has expired; and
  adjusting an expiration of the second timer based on an elapsed time between the receipt of the random access response and the expiration of the valid time period for the first timing advance information.

23. The non-transitory computer-readable medium of claim 22, wherein the computer-readable medium further comprises one or more instructions for transmitting uplink data to the BS,
  wherein the one or more instructions for transmitting uplink data utilizes the first timing advance information when the first timing advance information is within the valid time period for the first timing advance information, and wherein the one or more instructions for transmitting uplink data utilizes the second timing advance information when the valid time period for the first timing advance information has expired.

24. The non-transitory computer-readable medium of claim 22, wherein the one or more instructions for utilizing the second timing advance information for uplink communications with the BS after determining that the valid time period for the first timing advance information has expired comprises one or more instructions for
  transmitting a scheduling request to the BS utilizing the second timing advance information.

25. The non-transitory computer-readable medium of claim 22, wherein the computer-readable medium further comprises one or more instructions for storing the second timing advance information received in the random access response.

26. The non-transitory computer-readable medium of claim 25, wherein the storing of the second timing advance information is performed after it is determined that the first timing advance information is within the valid time period for the first timing advance information.

27. The non-transitory computer-readable medium of claim 22, wherein the RRC connection request is transmitted to the BS using a unique UE identification; and wherein the contention resolution response received from the BS responsive to the RRC connection request comprises the unique UE identification.

28. The non-transitory computer-readable medium of claim 22, wherein the BS is an enhanced-NodeB (eNodeB) within a Long Term Evolution (LTE) wireless communications network.

29. A user equipment (UE), comprising:
  a receiver configured to receive first timing advance information associated with uplink wireless communications with a base station (BS);
  a transmitter configured to:
    transmit a random access connection request message to the BS, wherein the receiver is further configured to receive a random access response from the BS while the first timing advance information associated with uplink wireless communications with the BS is within a valid time period for the first timing advance information, the random access response comprising second timing advance information associated with uplink wireless communications with the BS; and
    transmit a radio resource control (RRC) connection request to the BS after the receiver receives the random access response, wherein the receiver is further configured to receive a contention resolution response from the BS responsive to the RRC connection request; and
  at least one processor configured to:
    initiate a first timer associated with the first timing advance information to measure the valid time period for the first timing advance information;
    determine, after the receiver receives the contention resolution response, that the valid time period for the first timing advance information has expired;
    utilize the second timing advance information for uplink communications with the BS after determining that the valid time period for the first timing advance information has expired;
    initiate a second timer, different from the first timer, associated with the second timing advance information for a valid time period for the second timing advance information after determining that the valid time period for the first timing advance information has expired; and
    adjust an expiration of the second timer based on an elapsed time between the receipt of the random access response and the expiration of the valid time period for the first timing advance information.

* * * * *